T. KNIGHT & J. G. BENNETTS.
BEARING BOX.
APPLICATION FILED MAY 19, 1914.
1,143,208.
Patented June 15, 1915.
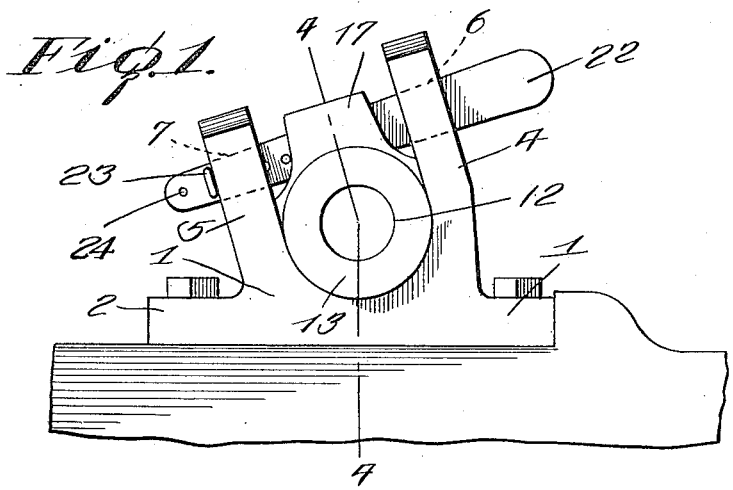
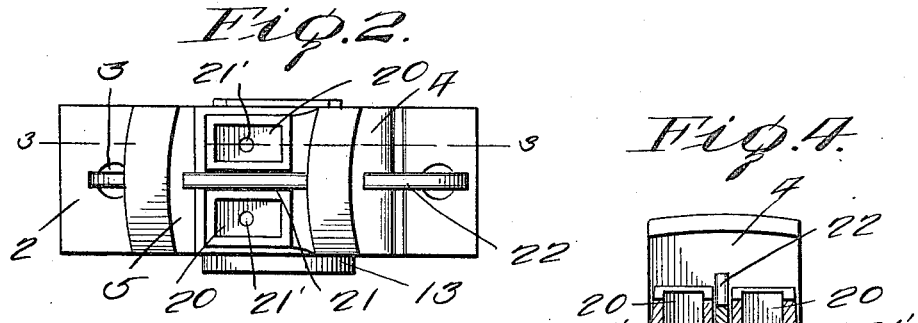
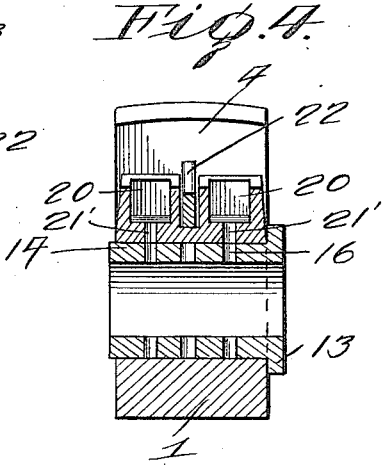
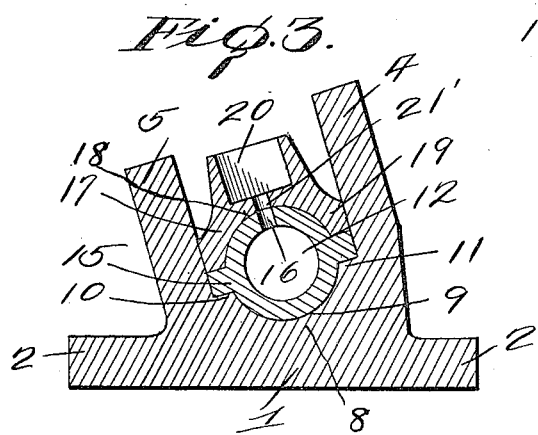
Inventor
T. Knight
J. G. Bennetts

UNITED STATES PATENT OFFICE.

THOMAS KNIGHT AND JOHN G. BENNETTS, OF AHMEEK, MICHIGAN.

BEARING-BOX.

1,143,208.  Specification of Letters Patent.  Patented June 15, 1915.

Application filed May 19, 1914. Serial No. 839,585.

*To all whom it may concern:*

Be it known that we, THOMAS KNIGHT and JOHN G. BENNETTS, citizens of the United States, residing at Ahmeek, in the county of Keweenaw, State of Michigan, have invented certain new and useful Improvements in Bearing-Boxes; and we do hereby declare the following to be a full, clear, and exact description of the invention, such as will enable others skilled in the art to which it appertains to make and use the same.

This invention relates to a bearing box.

An object of the invention is to provide a box of such character in which the bearing may be quickly placed or detached therefrom.

With this and other objects in view, such as will appear as the description progresses, our invention comprises the combination and arrangement of parts as herein set forth and subsequently claimed.

Referring to the drawings: Figure 1 is a perspective view of our device. Fig. 2 is a plan view thereof. Fig. 3 is a section on line 3—3 of Fig. 2. Fig. 4 is a section on line 4—4 of Fig. 2.

Referring to the drawing by reference characters wherein like parts are indicated by like characters throughout the several views: Our device comprises a base member 1 having flanges 2 formed thereon through which holes 3 extend by means of which the box may be clamped in place on a desirable support by passing bolts through the same. Extending upwardly at angles to the base two arms 4 and 5, are provided, the arm 4 being longer than the arm 5. In these arms are formed apertures 6 and 7 tapered transversely of the said arms and in alinement with each other. The aperture 6 is considerably longer than the aperture 7 and is of equal width. Between these arms at the lower part thereof is an integrally formed portion 8 which has a concaved face 9 and flanges 10 and 11, the flange 10 being formed adjacent the arm 5 and the flange 11 adjacent the arm 4. The flange 11 is relatively higher than the flange 10. Detachably mounted in this concaved portion 9 is a bearing 12 having a flange 13 on one end and a tubular portion 14 which extends transversely across the box and rests in the concaved face 9 of the portion 8. Extending outwardly from this tubular portion are two wings 15, one of which rests upon the flange 10 and the other on the flange 11. Holes 16 are formed in this tubular portion through which oil may be fed to the shaft which is mounted in this portion 14 and rotatable thereon. In order to maintain this bearing 12 in its operative position a clamp member 17 is provided, which has a concaved lower face 18 of a contour similar to the contour of the tubular portion 14 and downwardly extending legs 19 which contact with the upper faces of the wings 15. In the upper side of this member 17 is integrally formed two oil boxes 20 which are spaced apart and thus form a slot 21 therebetween, which slot is in alinement with the apertures 6 and 7, the bottom of which slot inclines downwardly. In the bottoms of the boxes 20 are formed apertures 21' through which oil or grease is fed to the shaft. After this member 17 has been put in place the locking bar 22 which is of tapered formation and rectangular in cross section is inserted through the aperture 6 and thence passed downwardly through the slot 21 and thence through the aperture 7. The tapered formation of this bar riding on the inclined lower face of the slot 21 pushes the member 17 tightly into engagement with the bearing 12 and holds the said bearing in place. A cotter pin 23 is then inserted through one of a series of apertures 24 formed in the smaller end of the bar 22. Because of the fact that this bar has formed therein a series of apertures bearings of various sizes may be accommodated, for by inserting the bar 22 through the apertures 6 and 7 so that the end hole may be engaged by the cotter pin, a large bearing may be accommodated, but should it be desired to accommodate a smaller bearing the bar is pushed downwardly through the apertures 6 and 7 a greater distance and the cotter pin is engaged in one of the other apertures. This movement of the bar 22 is allowed because of the fact that the apertures 6 and 7 are of greater longitudinal dimensions than the respective portions of the bar seated therein.

From the foregoing description it may be seen that we have provided a device which is very simple in construction, but yet by means of which the bearing may be readily removed and replaced since it is only necessary to knock out the cotter pin and thence withdraw the bar 22 which withdrawing action is facilitated by the tapered construction of the pin.

We do not wish to be limited to the particular embodiment of our invention shown, for it is obvious that numerous changes may be made within the scope of the invention as defined by the claim.

What is claimed is:—

A device of the class described comprising a base having spaced arms extending upwardly at acute angles therefrom and provided with transversely alined apertures, said base between the arms being formed with a concaved upper face and shoulders at each side of said concavity, a tubular bearing mounted in said concavity and having wings engaging said shoulders, a clamping member between the arms shaped to embrace the bearing member and engage said wings, said clamping member being further formed on its upper portion with spaced projections providing therebetween a groove, and a locking bar inserted through the apertures in the arms and lying within the groove to maintain the clamping member in its operative position.

In testimony whereof, we affix our signatures, in the presence of two witnesses.

THOMAS KNIGHT.
JOHN G. BENNETTS.

Witnesses:
NOAH BENNETTS,
HARRY M. SEBRING.

Copies of this patent may be obtained for five cents each, by addressing the "Commissioner of Patents, Washington, D. C."